(12) United States Patent
Wang

(10) Patent No.: US 12,311,825 B1
(45) Date of Patent: May 27, 2025

(54) VEHICLE MOUNTED MOBILE KITCHEN

(71) Applicant: Zengbao Wang, Shanghai (CN)

(72) Inventor: Zengbao Wang, Shanghai (CN)

( * ) Notice: Subject to any disclaimer, the term of this patent is extended or adjusted under 35 U.S.C. 154(b) by 0 days.

(21) Appl. No.: 18/793,717

(22) Filed: Aug. 2, 2024

(51) Int. Cl.
*B60F 3/00* (2006.01)
*B60P 3/36* (2006.01)

(52) U.S. Cl.
CPC ..................... *B60P 3/36* (2013.01)

(58) Field of Classification Search
None
See application file for complete search history.

(56) References Cited

U.S. PATENT DOCUMENTS

| | | | |
|---|---|---|---|
| 6,814,383 B2 * | 11/2004 | Reed, III | B60P 3/0257 224/404 |
| 6,915,797 B1 * | 7/2005 | Lightbourne | F24C 7/10 126/9 R |
| 10,174,952 B1 * | 1/2019 | King | A47J 37/0763 |
| 11,466,861 B2 * | 10/2022 | Gross | A47J 47/16 |

* cited by examiner

*Primary Examiner* — Joseph D. Pape
(74) *Attorney, Agent, or Firm* — Birchwood IP

(57) ABSTRACT

A vehicle mounted mobile kitchen is provided, which includes a first storage box and a second storage box, a longitudinal section of the first storage box is in a shape of a rectangular frame, inner walls of both sides of the first storage box are provided with a sliding groove at positions near a bottom of the first storage box; outer walls of both sides of the second storage box are provided with a sliding strip at positions near a bottom of the second storage box. The second storage box is slidably connected to the inner walls of two sliding grooves through the sliding strip. The second storage box is located in the first storage box and includes a storage platform and a placement platform. The placement platform is installed at one side of an outer wall of a top of the storage platform.

7 Claims, 5 Drawing Sheets

VEHICLE MOUNTED MOBILE KITCHEN

TECHNICAL FIELD

The present disclosure relates to the field of vehicle mounted equipment technologies, and in particular, to a vehicle mounted mobile kitchen.

BACKGROUND

More and more people are starting to go on self-driving trips to the wilderness. When having picnics in the wilderness, it is necessary to preserve and process ingredients, thus, a vehicle mounted mobile kitchen is needed to solve the above problems.

However, there are some problems with the use of existing vehicle mounted mobile kitchens. The vehicle mounted mobile kitchens are too large, occupying a lot of space inside the vehicle, the folding and storage ways are complex, and the vegetable cutting platform is small, rendering it impossible to place items such as washing basins.

Therefore, technicians in this field have proposed a vehicle mounted mobile kitchen to solve the problems raised in the background technology.

SUMMARY

In order to solve the above technical problems, the present disclosure provides a vehicle mounted mobile kitchen to address the problems of the existing technology where the vehicle mounted mobile kitchen is too large, occupies a lot of space in the vehicle, has a complex folding and storage way, has a small vegetable cutting platform, and cannot accommodate items such as washing basins.

A vehicle mounted mobile kitchen, including:
- a first storage box, a longitudinal section of the first storage box is in a shape of a rectangular frame, inner walls of both sides of the first storage box are provided with two sliding grooves at positions near a bottom of the first storage box;
- a second storage box, outer walls of both sides of the second storage box are provided with a sliding strip at positions near a bottom of the second storage box; the second storage box is slidably connected to inner walls of the two sliding grooves through the sliding strip; the second storage box is located in the first storage box and includes a storage platform and a placement platform; the placement platform is installed on one side of an outer wall of a top of the storage platform; an outer wall of a bottom of the storage platform is attached to an inner wall of a bottom plate of the first storage box; an interior of the storage platform is hollow; the second storage platform is capable of moving horizontally within the first storage box;
- a third storage box, which is slidably connected to an inner wall of the storage platform and moves horizontally inside the storage platform;
- a fourth storage box, both sides of an outer wall of a bottom of the fourth storage box are fixedly installed with a strip-shaped plate; two sliding rails are fixedly installed on the outer wall of the top of the storage platform; the two sliding rails are located on the same side of the placement platform; the two strip-shaped plates are slidably connected to inner walls of the corresponding two sliding rails; the fourth storage box moves longitudinally on surfaces of the two sliding rails; the fourth storage box, the third storage box and the second storage box are all be stored in the first storage box; the four storage box, the third storage box and the second storage box are capable being unfolded outward.

In an embodiment of the present disclosure, outer walls of both sides of the first storage box are fixedly provided with a handle at positions close to a lower of the first storage box.

In an embodiment of the present disclosure, a center position of an outer wall of a top of the placement platform is provided with an installation groove, and a vegetable washing basin is provided on an inner wall of the installation groove.

In an embodiment of the present disclosure, a first cavity is provided in the third storage box, and a barbecue grill is provided in the first cavity.

In an embodiment of the present disclosure, a center of an outer wall on one side of the third storage box away from the storage platform is provided with a bayonet.

In an embodiment of the present disclosure, one side of an outer wall of a top of the fourth storage box is hinged with a second cover plate; an outer wall of one side of the second cover plate is hinged with a first cover plate, and an interior of the fourth storage box is provided with a second cavity.

In an embodiment of the present disclosure, a plurality of hooks are evenly distributed on an outer wall of one side of the fourth storage box at equidistance.

Compared with the existing technology, the present disclosure has the following beneficial effects.

1. The present disclosure provides a first storage box, a second storage box, a third storage box, and a fourth storage box. The third storage box can be stored in the storage platform of the second storage box, the fourth storage box can be stored on a surface of the storage platform of the second storage box, and the second storage box can be stored in the first storage box, so that second storage box, third storage box, and fourth storage box can all be stored in the first storage box, thereby reducing the space occupied by the device. At the same time, the device can be unfolded to a large area. A vegetable washing basin can be placed on the placement platform of the second storage box, and a barbecue grill can be placed in the third storage box. After unfolding the fourth storage box, items can be stored, and the first cover plate and the second cover plate on the surface of the fourth storage box can also be flattened and thereby forming a vegetable cutting platform.

2. The folding and storage way of the device of the present disclosure is simple. The vegetable cutting platform can be folded, which increases a cutting area after unfolding. The placement platform is larger and has an installation groove for easy placement of the vegetable washing basin. The hook and the fourth storage box are closer to an operator, rendering it more convenient to use. After unfolding, an additional storage platform for placing items is added.

Numeral reference: 1. first storage box; 2. second storage box; 3. placement platform; 4. vegetable washing basin; 5. storage platform; 6. sliding rail; 7. barbecue grill; 8. bayonet; 9. third storage box; 10. hook; 11. fourth storage box; 12. second cover plate; 13. first cover plate; 14. handle; 15. Strip-shaped plate.

DESCRIPTION OF EMBODIMENTS

Below, a further detailed description of the embodiments of the present disclosure will be provided in combination with the accompanying drawings and embodiments. The following embodiments are used to illustrate the present disclosure, but cannot be used to limit the scope of the present disclosure.

Figure 1:
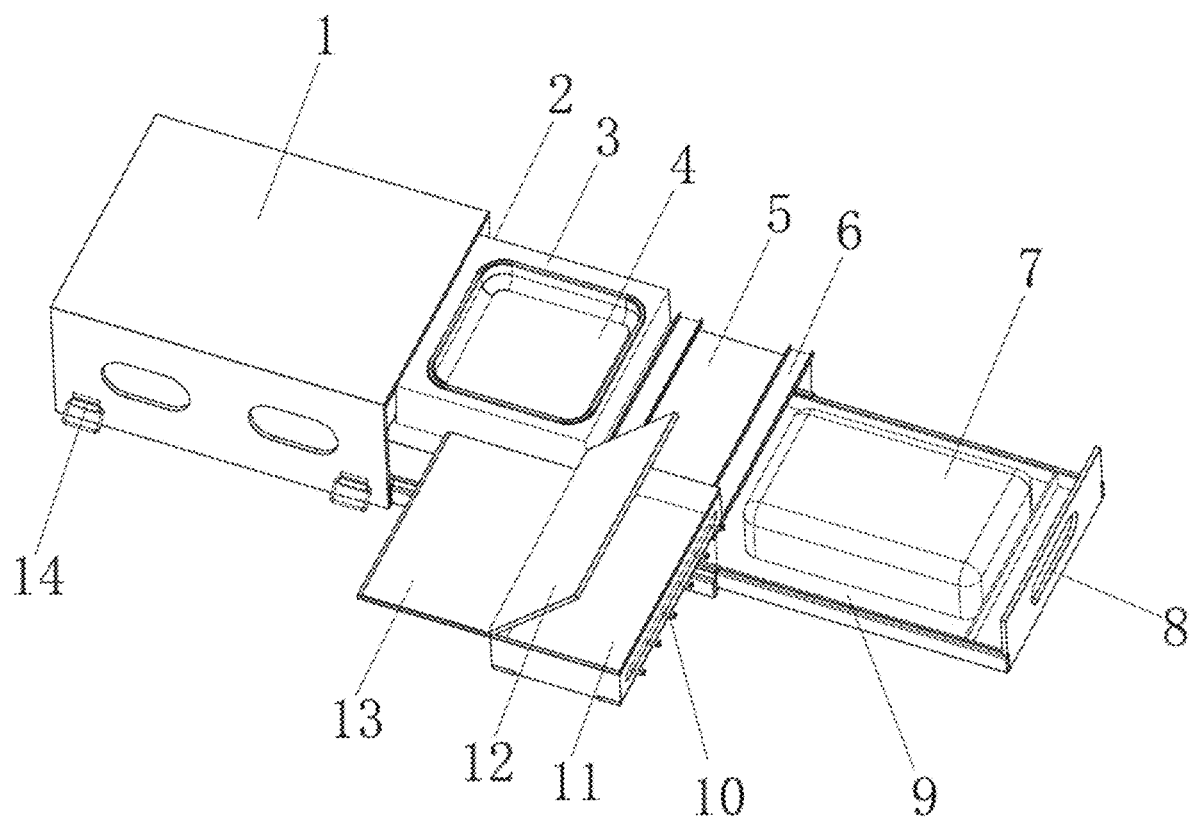
FIG. 1 is a schematic diagram of an overall structure of the present disclosure.
Figure 2:
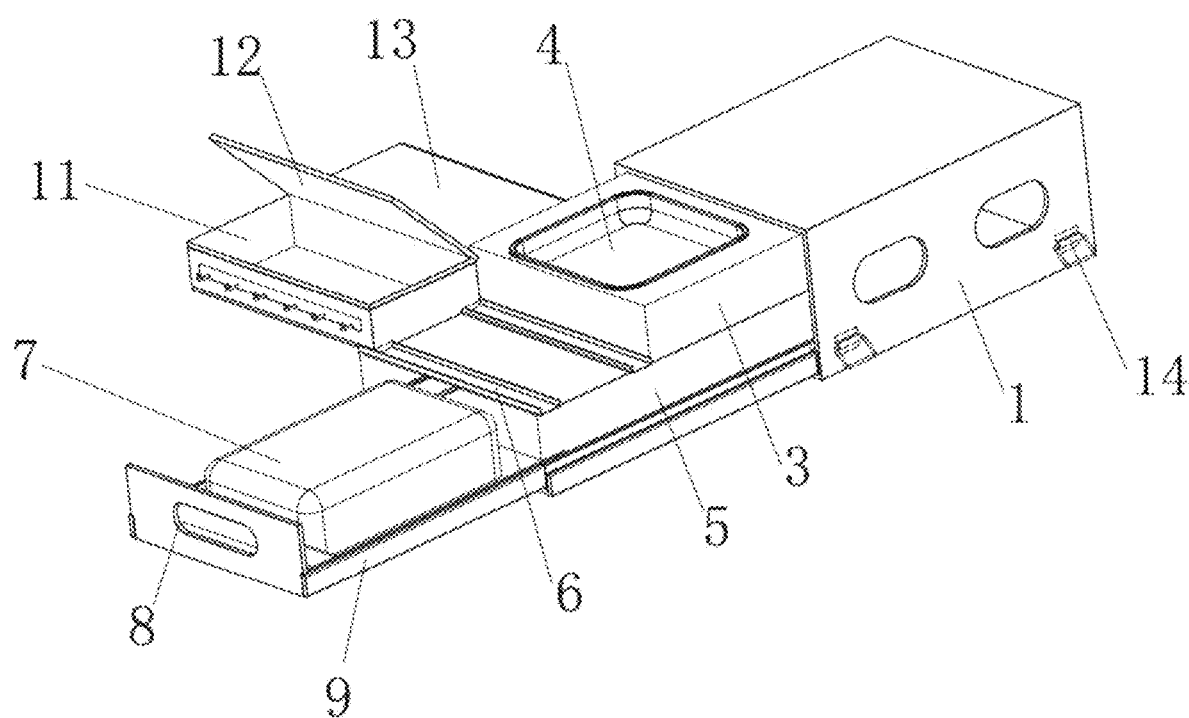
FIG. 2 is a schematic structural diagram of FIG. 1 from another angle.
Figure 3:
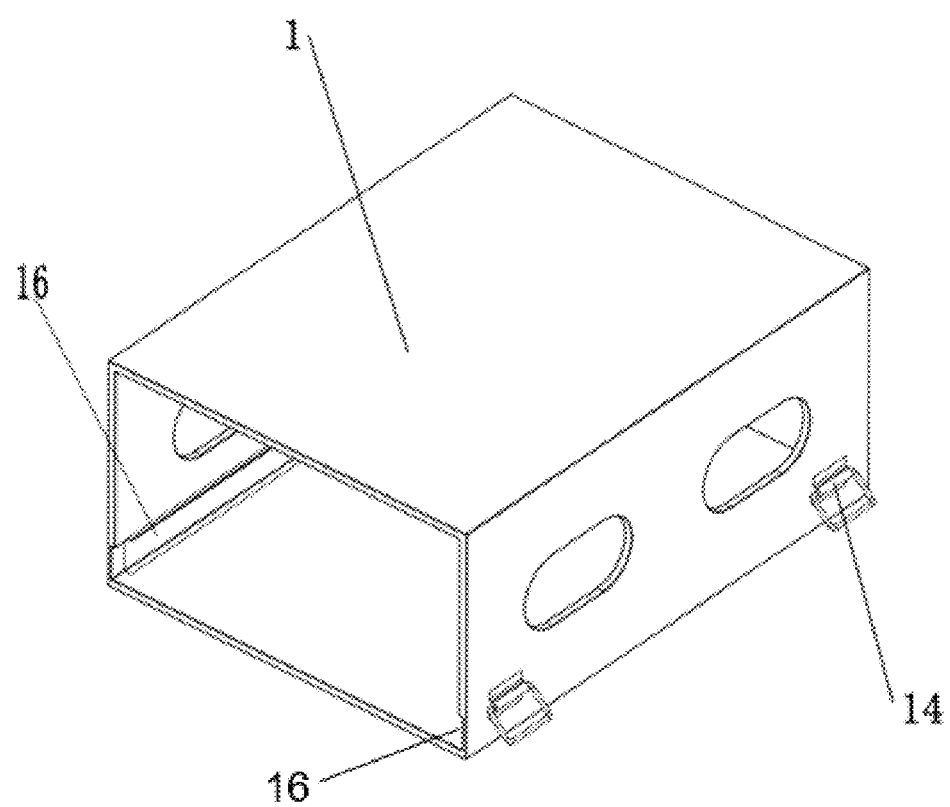
FIG. 3 is a schematic structural diagram of a first storage box of the present disclosure.
Figure 4:
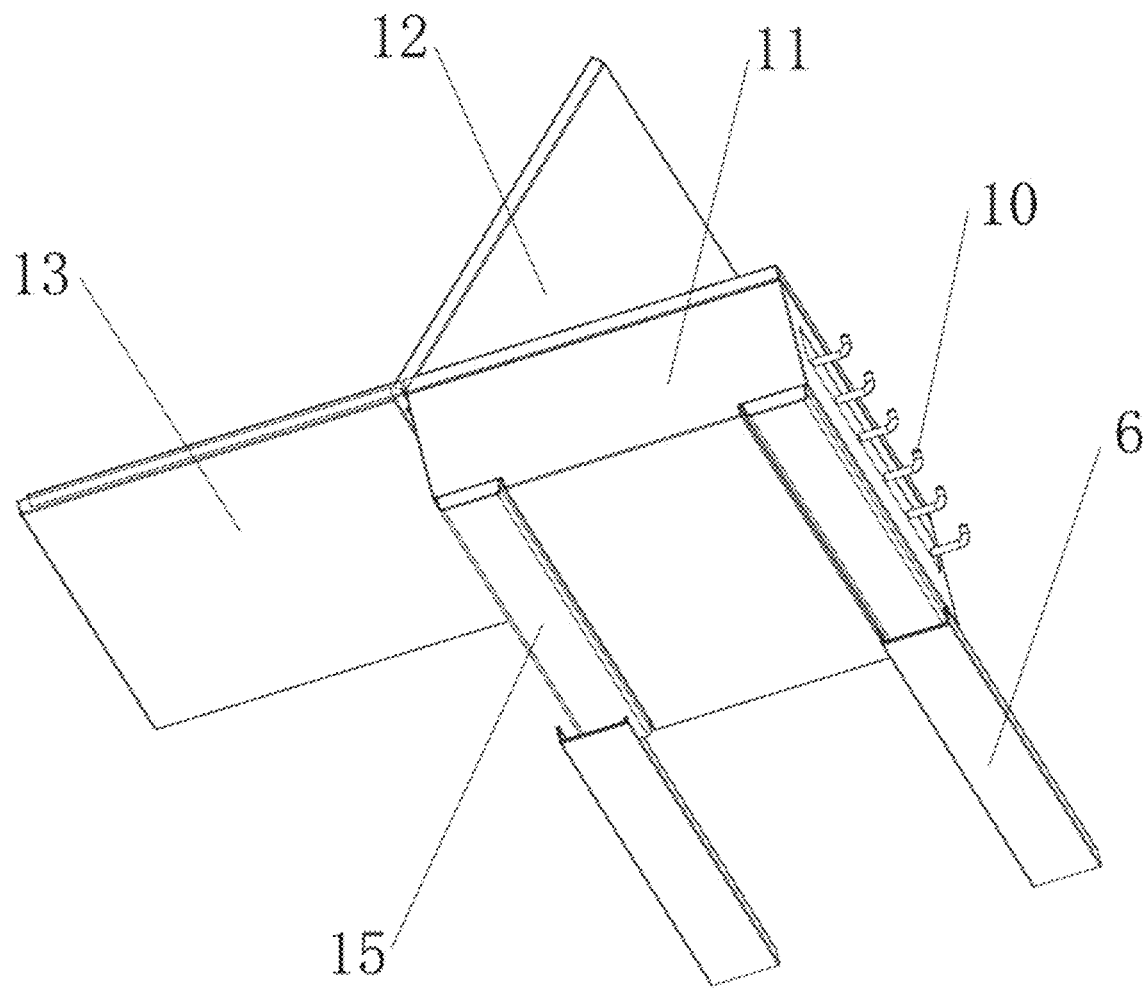
FIG. 4 is a schematic structural diagram of a fourth storage box and a sliding rail of the present disclosure.
Figure 5:
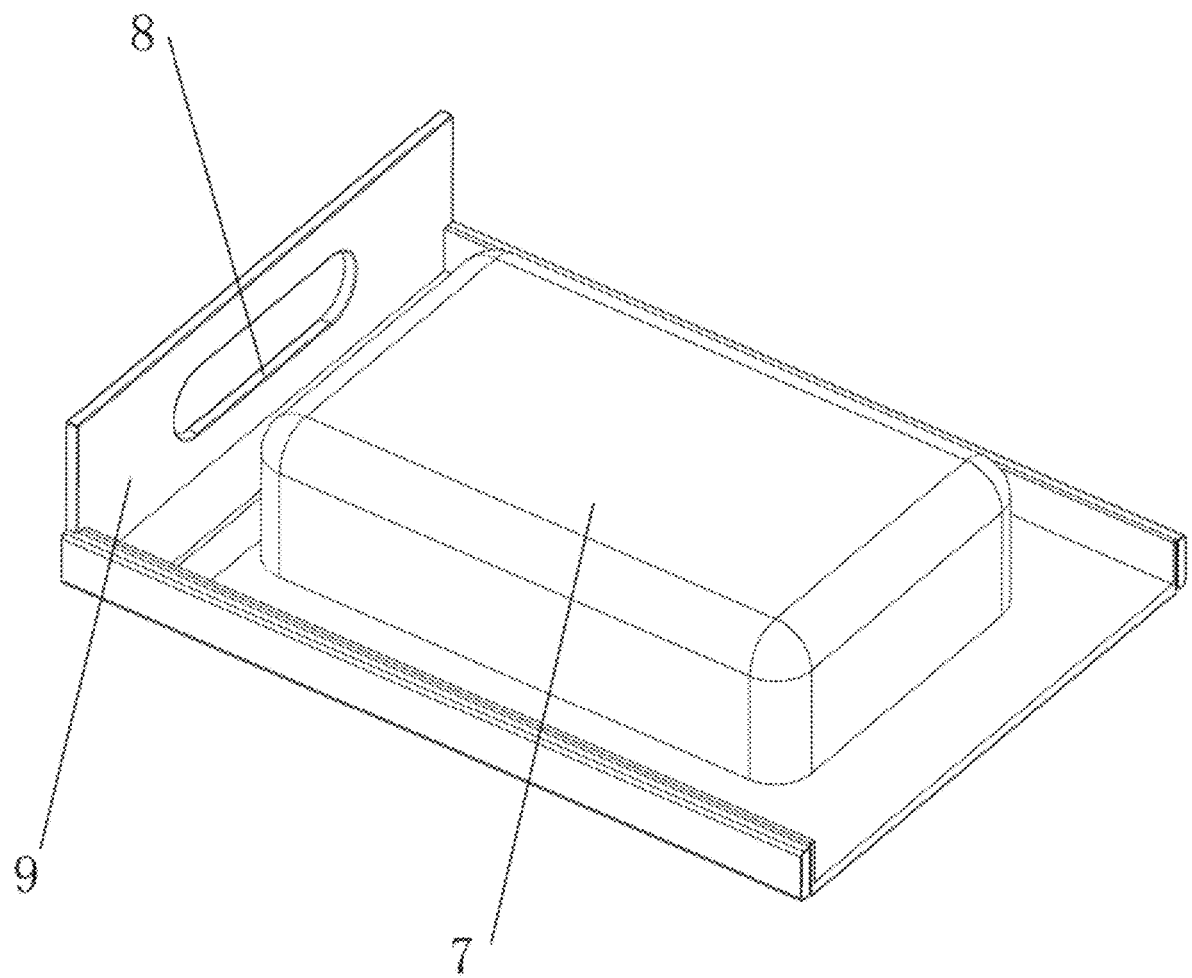
FIG. 5 is a schematic structural diagram of a third storage box and a barbecue grill of the present disclosure.

Referring to FIGS. 1-5, the present disclosure provides a vehicle mounted mobile kitchen, which includes:

a first storage box, a longitudinal section of the first storage box is in a shape of a rectangular frame, inner walls of both sides of the first storage box are provided with two sliding grooves 16 at positions near a bottom of the first storage box;

a second storage box 2, outer walls of both sides of the second storage box 2 are provided with a sliding strip at positions near a bottom of the second storage box 2; the second storage box is clamping connection to inner walls of the two sliding grooves 16 through the sliding strip; the second storage box 2 is located in the first storage box 1 and includes a storage platform 5 and a placement platform 3; the placement platform 3 is installed on one side of an outer wall of a top of the storage platform 5; an outer wall of a bottom of the storage platform 5 is attached to an inner wall of a bottom plate of the first storage box; an interior of the storage platform 5 is hollow, and the second storage box moves horizontally in the first storage box;

a third storage box 9, the third storage box 9 is slidably connected to an inner wall of the storage platform 5; the third storage box 9 moves horizontally in the storage platform 5;

a fourth storage box 11, two sides of an inner wall of a bottom of the fourth storage box 11 is fixedly installed with a strip-shaped plate 15. Two sliding rails 6 are fixedly installed on an outer wall of a top of the storage platform 5. The two sliding rails 6 are located on the same side of the placement platform 3, the two strip-shaped plates 15 are respectively slidably connected to inner walls of the corresponding sliding rails 6. The fourth storage box 11 moves longitudinally on surfaces of the sliding rails 6. The fourth storage box 11, the third storage box 9, and the second storage box 2 can all be stored in the first storage box 1; and the fourth storage box 11, the third storage box 9, and the second storage box 2 can all be unfolded outward.

As can be seen from the above, the third storage box 9 can be stored in the storage platform 5 of the second storage box 22, the fourth storage box 11 can be stored on a surface of the storage platform 5 of the second storage box 2, and the second storage box 2 can be stored in the first storage box 1, so that the second storage box 2, the third storage box 9, and the fourth storage box 11 can all be stored in the first storage box 1, thereby reducing the space occupied by the device. At the same time, when the device is unfolded, it can be spread out over a larger area.

In an implementation, a handle 14 is fixedly installed on both sides of an outer wall of first storage box 1 near both ends of the first storage box 1.

As can be seen from the above, the setting of the handle 14 facilitates the extraction of the first storage box, rendering it easy to carry the entire device for movement.

In an implementation, an installation groove is provided at a center of an outer wall of a top of the placement platform 3, and a vegetable washing basin 4 is provided on an inner wall of the installation groove.

As can be seen from the above, the vegetable washing basin 4 is placed in the installation groove on a surface of the placement platform 3, which is convenient for washing vegetables and cleaning items.

In an implementation, an interior of the third storage box 9 is provided with a first cavity, and an interior of the first cavity is provided with a barbecue grill 7.

As can be seen from the above, the barbecue grill 7 is provided in the third storage box 9, and the fourth storage box 41 is provided around the third storage box 9, which is convenient for a user to retrieve items at any time and thus facilitate barbecue.

In an implementation, a bayonet 8 is provided at a center of an outer wall on one side of the third storage box 9 away from the storage platform 5.

As can be seen from the above, through the setting of the bayonet 8, the user can pull the bayonet 8 on one side of first storage box 1 so as to pull out the second storage box 2 and the third storage box 9.

In an implementation, one side of an outer wall of a top of the fourth storage box 11 is hinged with a second cover plate 12, one side of an outer wall of the second cover plate 212 is hinged with a first cover plate 13, an interior of the fourth storage box 11 is provided with a second cavity.

As can be seen from the above, after the first cover plate 13 and the second cover plate 12 are laid flat, a vegetable cutting platform is formed, which is convenient for the user to carry out corresponding work on the vegetable cutting platform.

In an implementation, a plurality of hooks 10 are evenly distributed on one side of an outer wall of the fourth storage box 11.

As can be seen from the above, there is a hook 10 on a front of the fourth storage box 11, which can be used to hang spoons and other related items.

When in use, the second storage box 2, the third storage box 9, and the fourth storage box 11 are all stored in the first storage box 1 and placed in the vehicle, without taking up too much space inside the vehicle. When the device needs to be used, two people can lift the handles 14 on both sides so as to lift it out, then stand on one side of the first storage box 1 and pull out the second storage box 9 and the second storage box 2 through the bayonet 8. Then the fourth storage box 11 is pushed to one side, and the first cover plate 13 and second cover plate 12 are laid flat. The device will be fully unfolded, and the barbecue personnel will stand in an area surrounded by the third storage box 9 and the fourth storage box 11, and face the barbecue grill 7 for barbecue work. The hook 10 and vegetable cutting platform on one side are convenient for them to prepare for barbecue and other activities. The vegetable washing basin 4 is located on the surface of the placement platform 3, which can be used by the user to wash vegetables or other items. After using the device, cleaning and drying it, the second storage box 2, the third storage box 9, and the fourth storage box 11 are all stored in the first storage box 1, and then put them back inside the vehicle.

The standard parts used in the present disclosure can be purchased from the market, and the irregular parts can be customized according to the specification and drawings. The specific connection ways of each part are conventional means such as bolts, rivets, and welding that are mature in the existing technology. The machinery, parts, and equipment are all conventional models in the existing technology, and the circuit connection is also conventional connection methods in the existing technology, which will not be described in detail here. The content not described in detail in this specification belongs to the existing technology known to those skilled in the art.

In the description of the present disclosure, terms "first" and "second" are only used for descriptive purposes and should not be understood as indicating or implying relative importance or implying the number of technical features indicated. Thus, the features limited to "first" and "second" may explicitly or implicitly include one or more of these features. The meaning of "a plurality of" is two or more, unless otherwise specified.

In the present disclosure, unless otherwise specified and limited, terms "installation", "connection with", "connection to", "fixation", etc. should be broadly understood, for example, they can be a fixed connection, a detachable connection, or integrated; it can be a mechanical connection or an electrical connection; it can be directly connected or indirectly connected through an intermediate medium, and it can be a connection within two components or an interaction relationship between two components. For those skilled in the art, specific meanings of the above terms in the present disclosure can be understood according to a specific situation.

In the present disclosure, unless otherwise specified and limited, the first feature may be in direct contact with the second feature by "on" or "down" the second feature, or the first and second features may be in indirect contact through an intermediate medium. Moreover, the first feature being "above", "up", or "on top of" the second feature may indicate that the first feature is directly above or diagonally above the second feature, or simply that the first feature is horizontally higher than the second feature. The first feature can be located directly or diagonally below the second feature, or simply indicate that the first feature has a lower horizontal height than the second feature.

In the description of this specification, reference terms "one embodiment", "some embodiments", "examples", "specific examples" or "some examples" means that the specific features, structures, materials or characteristics described in combination with the embodiment or example are included in at least one embodiment or example of the present disclosure. In this specification, the schematic expressions of the above terms do not need to be directed towards the same embodiments or examples. Moreover, the specific features, structures, materials, or characteristics described can be combined in any one or more embodiments or examples in an appropriate manner. In addition, those skilled in the art can combine and incorporate different embodiments or examples described in this specification, as well as the features of different embodiments or examples, without conflicting with each other.

In the accompanying drawings disclosed in the present disclosure, only the structures related to the disclosed embodiments are mentioned, and other structures can refer to conventional designs. In the absence of conflicts, the same embodiment and different embodiments of the present disclosure can be combined with each other.

Although the present disclosure has been described in detail with reference to the aforementioned embodiments, it is still possible for those skilled in the art to modify the technical solutions described in the aforementioned embodiments, or to make equivalent substitutions for some of the technical features. Any modifications, equivalent substitutions, improvements, etc. made within the spirit and principles of the present disclosure should be included within the protection scope of the present disclosure.

What is claimed is:

1. A vehicle mounted mobile kitchen, comprising:
   a first storage box, a longitudinal section of the first storage box is in a shape of a rectangular frame, inner walls of both sides of the first storage box are provided with two sliding grooves at positions near a bottom of the first storage box;
   a second storage box, outer walls of both sides of the second storage box are provided with a sliding strip at positions near a bottom of the second storage box; the second storage box is slidably connected to inner walls of the two sliding grooves through the sliding strip; the second storage box is located in the first storage box and comprises a storage platform and a placement platform; the placement platform is installed at one side of an outer wall of a top of the storage platform; an outer wall of a bottom of the storage platform is attached to an inner wall of a bottom plate of the first storage box; an interior of the storage platform is hollow; the second storage platform is capable of moving horizontally within the first storage box;
   a third storage box, which is slidably connected to an inner wall of the storage platform and moves horizontally inside the storage platform;
   a fourth storage box, both sides of an outer wall of a bottom of the fourth storage box are fixedly installed with a strip-shaped plate; two sliding rails are fixedly installed on the outer wall of the top of the storage platform; the two sliding rails are located on the same side of the placement platform; the two strip-shaped plates are slidably connected to inner walls of the corresponding two sliding rails; the fourth storage box moves longitudinally on surfaces of the two sliding rails; the fourth storage box, the third storage box and the second storage box are all to be stored in the first storage box; the four storage box, the third storage box and the second storage box are capable of being unfolded outward.

2. The vehicle mounted mobile kitchen according to claim 1, wherein outer walls of both sides of the first storage box are fixedly provided with a handle at positions close to a lower end of the first storage box.

3. The vehicle mounted mobile kitchen according to claim 1, wherein a center position of an outer wall of a top of the placement platform is provided with an installation groove, and a vegetable washing basin is provided on an inner wall of the installation groove.

4. The vehicle mounted mobile kitchen according to claim 1, wherein a first cavity is provided in the third storage box, and a barbecue grill is provided in the first cavity.

5. The vehicle mounted mobile kitchen according to claim 1, wherein a center of an outer wall on one side of the third storage box away from the storage platform is provided with a bayonet.

6. The vehicle mounted mobile kitchen according to claim 1, wherein one side of an outer wall of a top of the fourth storage box is hinged with a second cover plate; an outer wall of one side of the second cover plate is hinged with a first cover plate, and an interior of the fourth storage box is provided with a second cavity.

7. The vehicle mounted mobile kitchen according to claim 1, wherein a plurality of hooks are evenly distributed on an outer wall of one side of the fourth storage box at equidistance.

* * * * *